(12) United States Patent
Lawrence et al.

(10) Patent No.: US 7,284,189 B1
(45) Date of Patent: Oct. 16, 2007

(54) TEMPLATE HELP PANE

(75) Inventors: Eric Lawrence, Kirkland, WA (US); Robert Nelson Ashby, III, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 10/285,792

(22) Filed: Oct. 30, 2002

(51) Int. Cl.
G06F 15/00 (2006.01)
(52) U.S. Cl. ........................................ 715/505; 715/517
(58) Field of Classification Search ................ 715/505, 715/705, 708, 517, 530, 522
See application file for complete search history.

(56) References Cited

U.S. PATENT DOCUMENTS

| 5,715,415 | A | 2/1998 | Dazey et al. | |
|---|---|---|---|---|
| 6,421,065 | B1 | 7/2002 | Walden et al. | |
| 6,424,995 | B1 | 7/2002 | Shuman | |
| 2002/0133516 | A1* | 9/2002 | Davis et al. | 707/513 |
| 2003/0122859 | A1* | 7/2003 | Aggarwal et al. | 345/708 |

OTHER PUBLICATIONS

"Introduction to CSS2" available at http://www.w3.org/TR/1998/WD-css2-19980128/intro.html, world Wide Web Consortium1998, p. 1-3.*

Furuta, et al. "Document Formatting Systems: Survey, Concepts, and Issues," ACM Computing Surveys, vol. 14, No. 3, Sep. 1982, p. 417-472.*

Gelernter, B., "Help Design Challenges in Network Computing," *The Sixteenth Annual International Conference of Computer Documentation: Scaling the Heights: The Future of Information Technology*, Quebec City, Quebec, Sep. 23-26, 1998, pp. 184-193.

Ikehata, Y. et al., "Content-independent EPSS with Automatic Context Sensing on the Web," *IPSJ Journal* 43(2):616-31, Feb. 2002.

* cited by examiner

*Primary Examiner*—William Bashore
*Assistant Examiner*—Amelia Rutledge
(74) *Attorney, Agent, or Firm*—Christensen O'Connor Johnson Kindness PLLC

(57) ABSTRACT

The present invention is directed to a method and system for providing up-to-date relevant information for an electronic document template, and documents created using a template. Each template is given a unique identifier when it is created. When a document is created using the template, the same template identifier is associated with the document. Various pieces of information written or assimilated by or for the author or authors of the template that help to explain how to use the template are associated with the template identifiers and stored in a remote data source. When a template or a document created using a template is opened that contains an identifier, a message is sent to the data store that results in the relevant information being retrieved. Retrieved relevant information is displayed in a pane adjacent to the template or the document created using the template.

8 Claims, 5 Drawing Sheets

TEMPLATE HELP PANE

FIELD OF THE INVENTION

This invention relates generally to templates and more particularly to providing relevant information for templates or a document built from a template.

BACKGROUND OF THE INVENTION

Computer applications provide a wide variety of services and are used to create a variety of documents. As applications have become more complicated, the authors of applications have used different methods to teach users how to use their applications. Computer applications are often delivered with templates to help users understand how to utilize the many features of the applications. Some templates are very simple and self-explanatory; however, as applications have become more sophisticated templates have become more complex. If users do not understand how to use a template, users can become easily confused or frustrated. As a result, documentation has been added to templates to explain and demonstrate the use of templates. However, it is difficult to predict where users of templates will have problems. In the past, if an author of a particular template learned of users' problems with the template after users had purchased applications including the template, the author has been unable to directly reach users to eliminate the problem by explaining how to use the template. In the past, one solution has been to place explanatory documentation on a Web site that is independently accessible by users, i.e., accessible by a user-controlled interconnection with the Web site, or by answering verbal (telephone) inquiries. Likewise, if the author (or authors) of a published application learns of a novel way to use a template embodied in the application, the author has not been able to directly pass on this information. Ideally, an author should be able to update information concerning a particular template and present updated information to template users as soon as the update information becomes available, when it will be the most useful to users. The present invention is directed to achieving this result.

SUMMARY OF THE INVENTION

The present invention is directed to providing a method and system for providing up-to-date relevant information for an object, namely, an electronic template and documents produced using the template. Each template is given a unique identifier when the template is created. When a document is created using the template, the template identifier is associated with the document. Various pieces of information written or assimilated by or for the author or authors ("relevant information") that help explain how to use the template are associated with the template identifiers.

When a user opens a template that contains an identifier, the application containing the template retrieves and displays the relevant information associated with the template, or links to the relevant information. More specifically, the application that opens the template, or a document created using the template, looks for the identifier. If the identifier is found, the application sends the identifier along with a request for relevant information to a remote search system. The remote search system locates all pieces of information that are associated with the identifier and sends the results back to the application that sent the search request.

After receiving the search results, the application checks the search results for valid data. The application filters and groups the information. Finally, the information is displayed in a template help pane concurrent with the open template, or open document created using the template.

In accordance with other aspects of this invention, the pieces of information associated with template identifiers are updatable.

In accordance with yet other aspects of this invention, as the author of the template (or others) creates or locates pieces of information suitable for association with a template, the author (or others) records the location of such pieces of information and associates the template identifier with the location for future retrieval.

In accordance with further aspects of this invention, each link includes an identifying title that is retrieved by the remote search system and supplied to the application that sent the search request. When selected by a user, the title functions as a link to the related information. Each link may be associated with any number of template identifiers.

In accordance with yet still other aspects of this invention, the logically grouped returned information is displayed in a window (pane) adjacent to a window that displays the template, or a document created using the template.

As will be readily appreciated, methods and systems formed in accordance with this invention eliminate some of the problems previously associated with applications containing templates. Because remotely located helpful documentation is automatically accessed when a template is opened, helpful documentation is easily updatable as new helpful documentation is developed or located. As a result, users' experiences are enhanced.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF A PREFERRED EMBODIMENT

Figure 1:
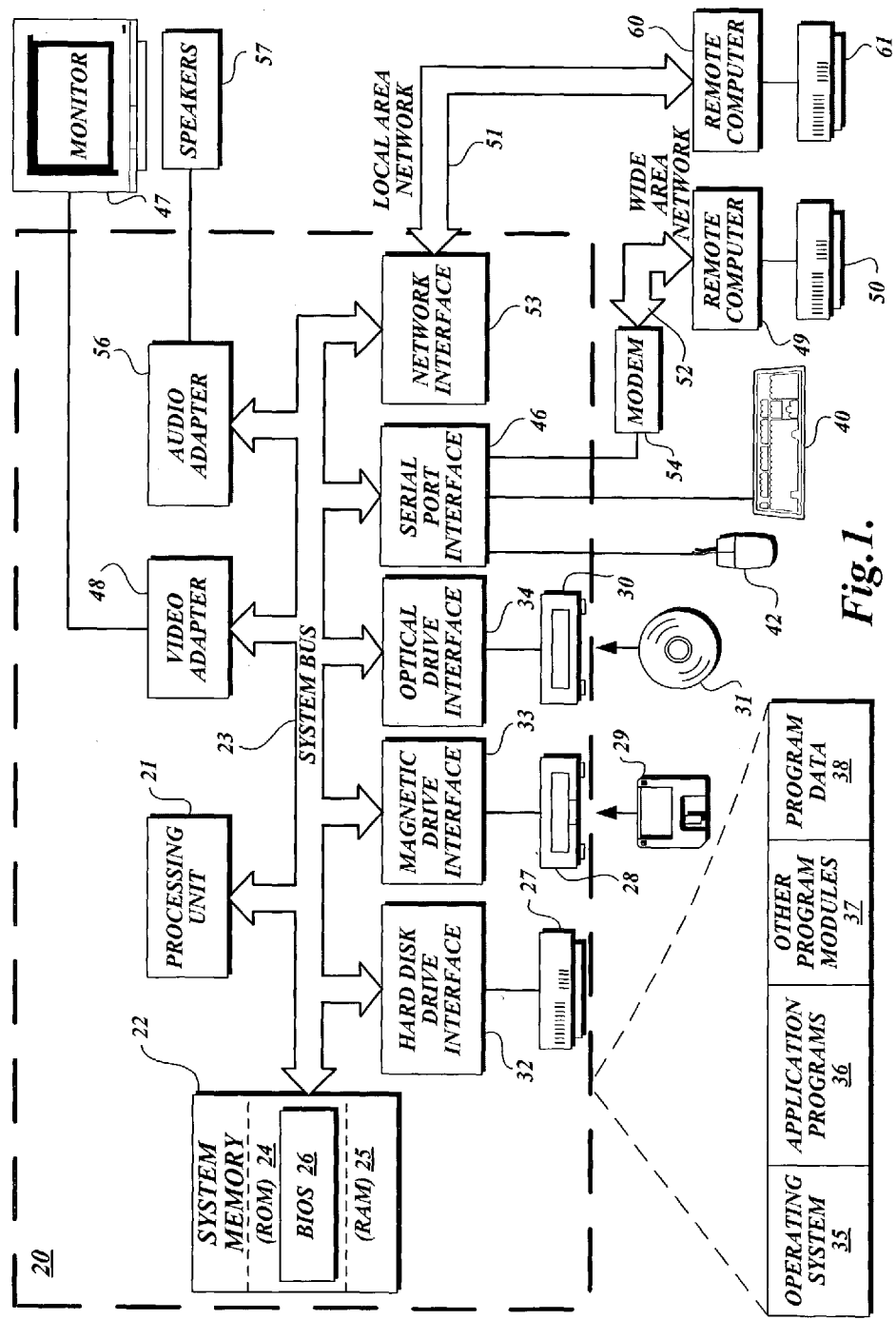
FIG. 1 is a block diagram of a general purpose computer system suitable for implementing certain aspects of the present invention.

The present invention is directed to providing a user of a template with the most recent and relevant information available when the user opens the template. Modern computer applications such as word processors, spreadsheets, and databases contain a myriad of features and functionality. Users of such applications often require some assistance in order to make best use of the applications. Providing templates is one method of assisting users. Templates are electronic documents designed to provide a jump-start for users. For example, a calendar template in a word processing program might automatically create a grid and enter the days of the month. Starting with such a template, a user could add personal appointments or artwork. The present invention is directed to displaying information relevant to users working with templates.

Historically, computer programmers provided documentation and help to accompany their applications. Originally, such documentation was provided in written form. More recently, help information along with an application is recorded on media, such as a CD or DVD, delivered to a customer. Due to the limits of time and space, the information accompanying an application does not contain every relevant item of information about the application. Editorial decisions require that some information be left out. Unfortunately, if a problem encountered by a user was not one of the problems anticipated by the author of an application, customers have to look beyond the information provided to the user with the application for an answer.

Although there are a variety of sources of information on how to use specific applications, such as books and articles, they are not perfect. A user can obtain a variety of information about applications by searching Web sites or contacting on-line newsgroups. These approaches for locating relevant information are cumbersome at best. They can require a user to search through a great deal of information before finding an answer. Often much of the information located is not relevant to the specific problem the user is trying to solve. In addition, because the source of specific information may be unknown, the information provided may be of dubious quality. Alternatively, a user can contact the author of the application (or the author's customer service department). This approach is expensive as well as time-consuming. It is expensive for an author to answer questions on a user-by-user basis. Further, the delay in getting assistance is often substantial. Finally, a user can purchase books or attend classes. These approaches require additional financial outlays and are unacceptable when a user is looking for immediate and specific answers to his or her questions.

As will be better understood from the following description, the present invention addresses the issues of relevance, cost, expediency and contextual support by providing template information updates after a user has received a program employing templates. This result is accomplished by correlating remotely located relevant user information to templates and/or documents created using templates in an inexpensive and efficient manner. Updated information is promptly distributed to many users at minimal incremental cost. Further relevant updated user information is available within seconds of opening a document. Finally, the author of a program can add, delete, or alter (i.e., update) information at anytime.

FIG. 1 is a block diagram of a general purpose personal computer suitable for implementing certain aspects of the invention. FIG. 1 and the following discussion are intended to provide a brief, general description of a suitable computing environment in which certain aspects of the invention may be implemented. Although not required, the computing environment will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, mini-computers, mainframe computers, and the like.

FIG. 1 illustrates an exemplary general purpose computing device in the form of a conventional personal computer 20, including a processing unit 21, system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the peripheral component interconnect (PCI) bus, the Industry Standard Architecture (ISA) bus, or the serial port interface 46, as appropriate. In a networked environment, program modules depicted relative to the personal computer 20, or portions thereof, may be stored in the remote memory storage device. It will be appreciated that the network connections shown are exemplary, and other means of establishing a communications link between the computers may be used.

Figure 2:
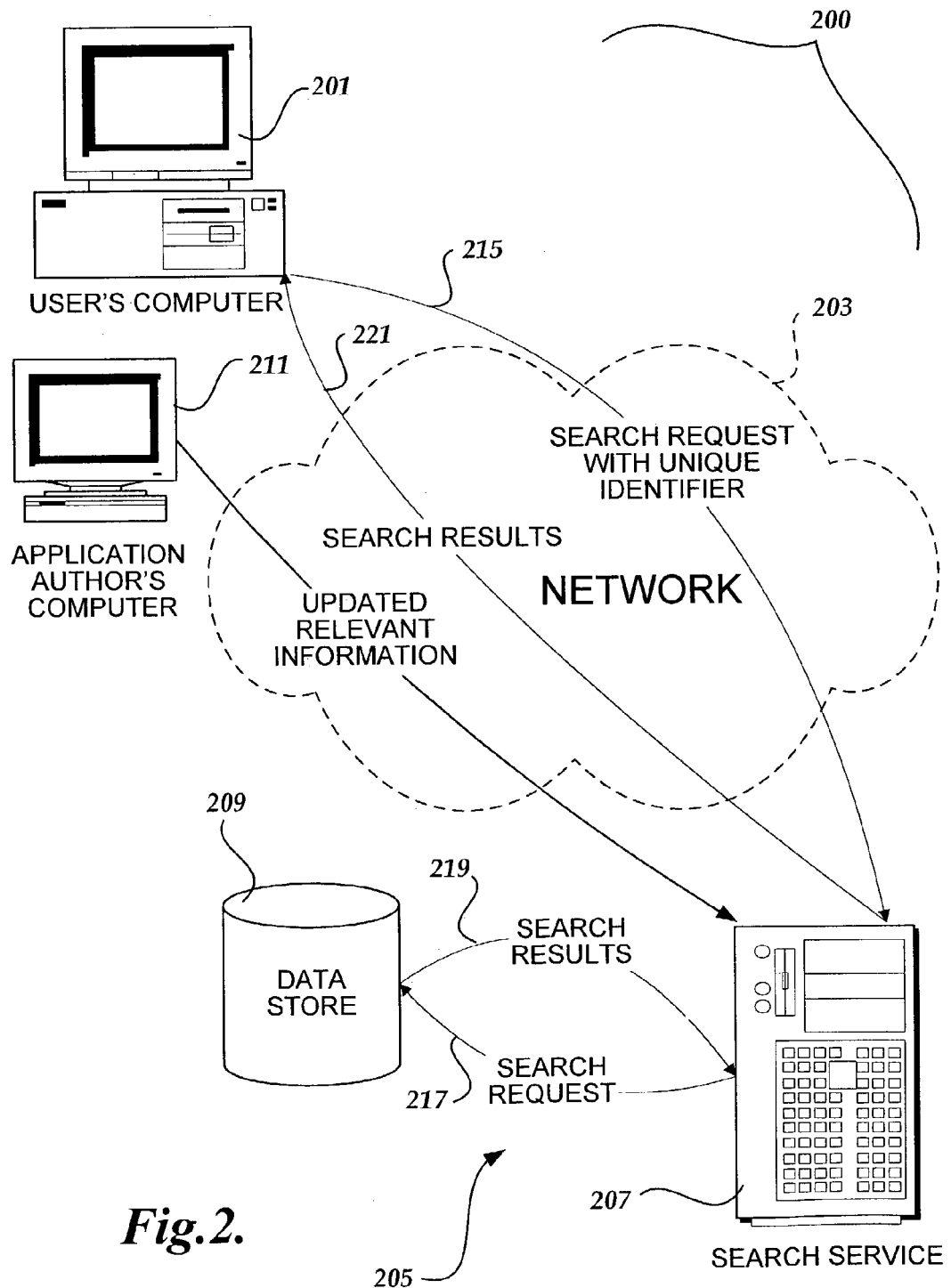
FIG. 2 is a pictorial diagram illustrating the local and remote components of an embodiment of the present invention.

FIG. 2 is a pictorial diagram illustrating the components of a system 200 suitable for implementing the present invention. The system 200 has two sides—a client's side and a server side coupled together by a network 203.

The client side of the system 200 is formed by a user's computer 201. The user's computer may take the form of a personal computer of this type illustrated in FIG. 1 or one of the variants described in connection with FIG. 1. In general, the user's computer 201 can be any one of a variety of computing devices that are capable of executing an application. The user's computer 201 is connected by the network 203 to the server side of the system 200. While the network 203 may be a local area network or a wide area network, preferably, the network is formed by the Internet. In a conventional manner, the network 203 couples the user's computer 201 to the server side of the system 200.

The server side of the system 200 includes a search service 205 and a data store 209. The search service 205 includes a computer 207, or other suitable device for accessing data stored in the data store 209. The computer or other device 207 and the data store 209 may take the form of a personal computer of the type shown in FIG. 1, or a related device, i.e., a supercomputer, mainframe, super minicomputer, minicomputer, etc. As noted, the data store 209 may be integral with the search service computer or other device 207, or be a separate stand-alone device including its own access computer. In summary, as will be readily appreciated by those skilled in the art and others, the service side of the system 200, i.e., the search service computer or other device 207 and the data store 209, may take on any one of a wide variety of configurations well known to those skilled in the art for storing data and accessing data stored in the data store upon receipt of a suitable inquiry. In this regard, in one actual embodiment of the invention, the search service calls an API that has a jet blue DB (database) and compiled ranking index. The DB is used to filter while the ranking algorithm and linked terms are in the compiled index, which is commonly called a search catalog. Thus, FIG. 2 should be considered illustrative of a system embodying the invention, not limiting.

FIG. 2 also includes an "application author's" computer 211. The application author's computer 211 allows the author of an application, or someone other than the author but having the appropriate security clearance, to update relevant information located in the data store 209. For ease of illustration, the application author's computer is illustrated as connected to the search service computer or other device 207 via the network 203. This coupling should be taken as illustrative, not limiting. The application author's computer 211 could be connected directly to the search service computer or other device 207 or directly to the data store 209, depending upon an actual implementation of the invention. Further, the application author's computer 211 could be connected to the search service computer or other device 207 or the data store 209 via a network independent of the network 203 illustrated in FIG. 2. Like the user's computer 201, the application author's computer 211 should be considered as exemplary, not limiting. Also, the term "application author" when used in connection with the application author's computer and at other places in this description should be taken as illustrative and not limiting since people other than an application author may add to, remove, or edit, i.e., update, information stored in the data store 209. Further, any computer connected to the search service computer or other device 207, or the data store 209 in any suitable manner, not just a single application author's computer, can be utilized to update the data store 303. Thus, again, application author's computer should be considered exemplary and illustrative, not limiting.

Figure 3:
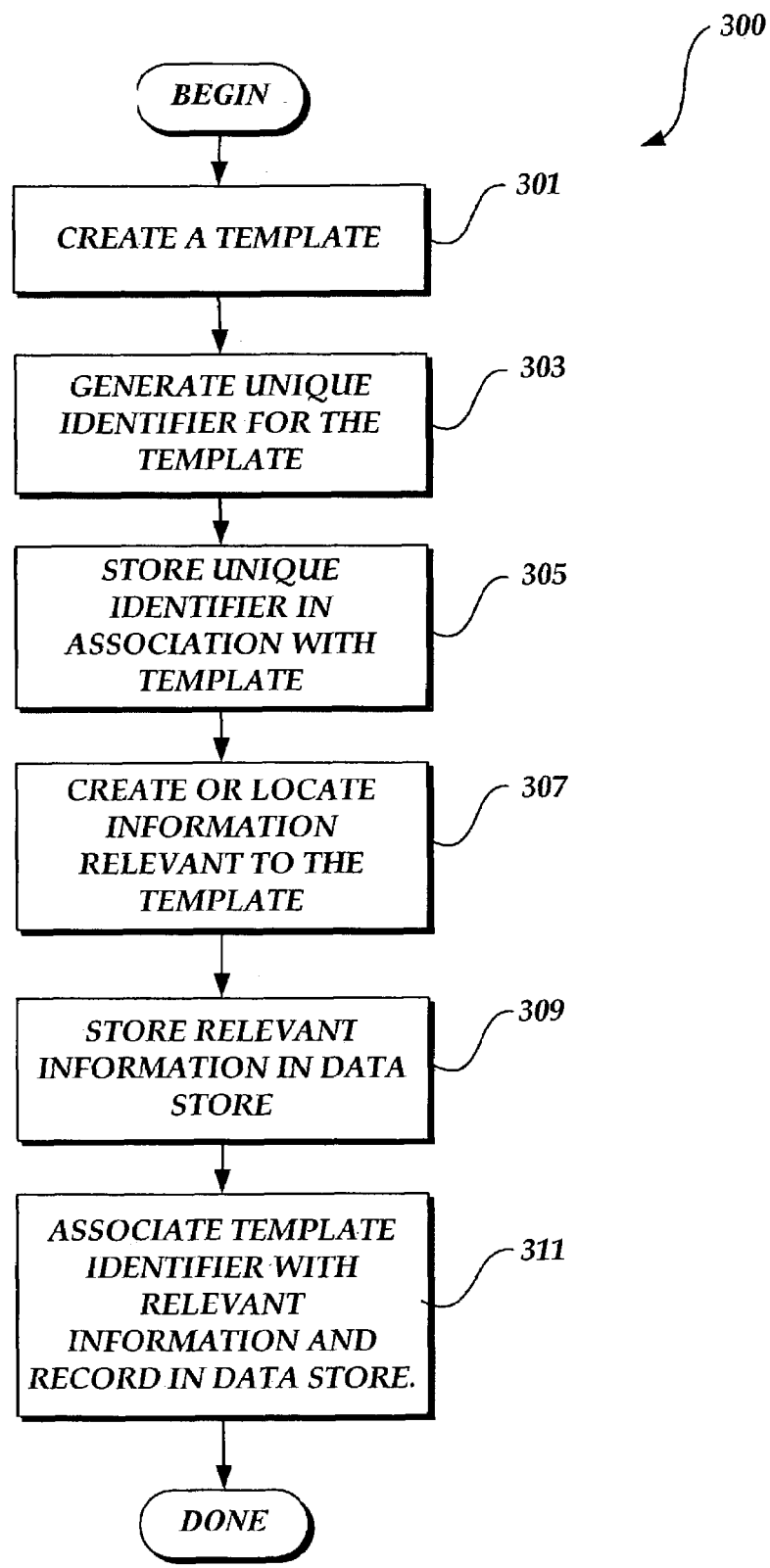
FIG. 3 is a flow diagram illustrating the process of associating relevant information with a template.
Figure 5:
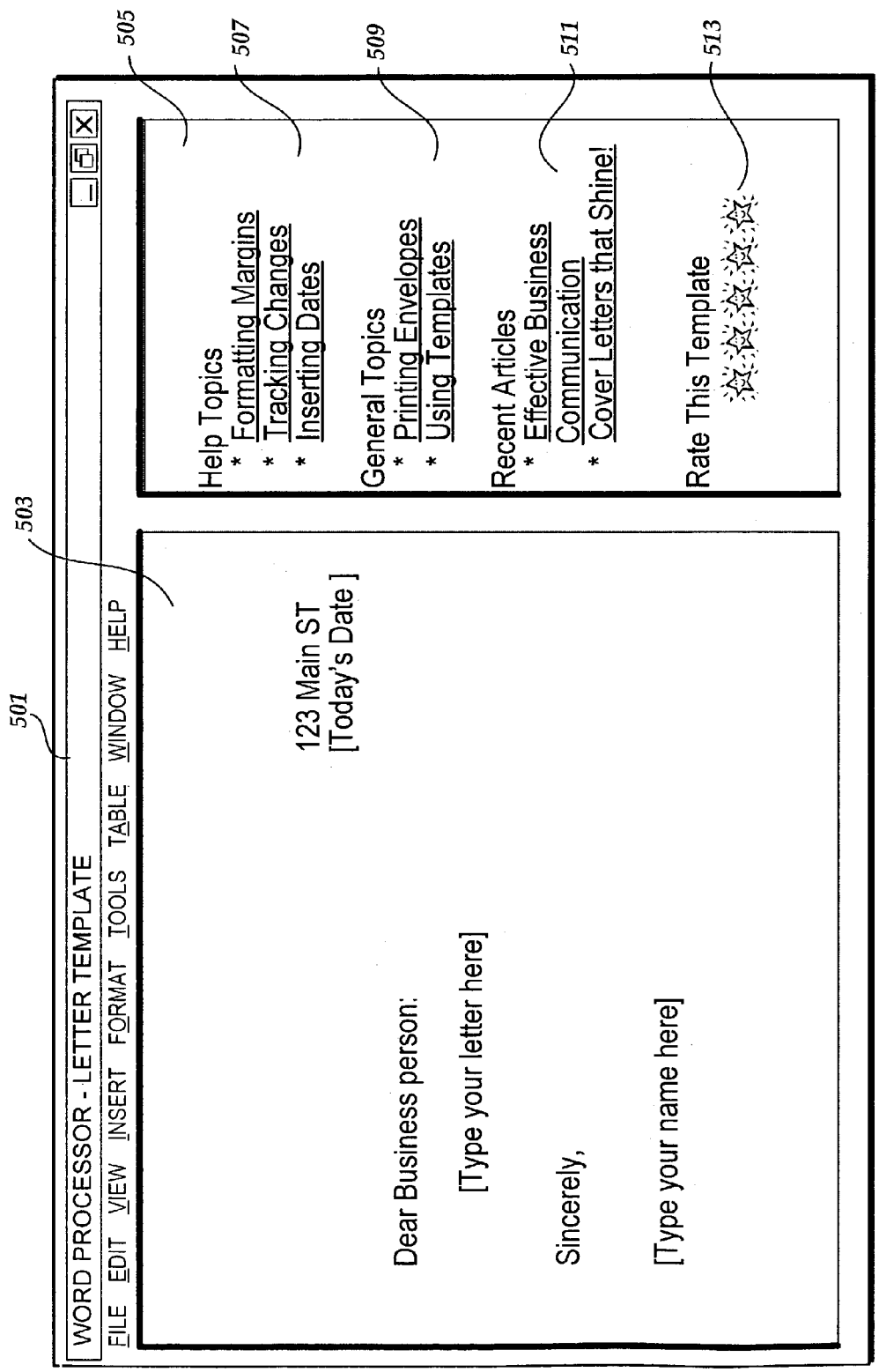
FIG. 5 is an exemplary screen shot showing a document template window and a relevant information window.

FIG. 3 is a functional flow diagram 300 illustrating the creation of a template and how relevant information is associated with the created template. At block 301, the template is created by an author or authors in a conventional manner. The creation process is dependent on the type of application associated with the template and does not, per se, form part of this invention. For example, the author of a word processor application might create a template for a business letter as shown in FIG. 5 and described below. After the author creates the template, as shown in block 303, the author creates a unique identifier for the template. The unique identifier created by the author is stored in association with the template as shown in block 305.

Next, at block 307, the author or authors of the template (or others at the request of the author or authors) creates or locates information relevant to the template. That is, the author (or others at the request of the author) can either author, i.e., create, information relevant to the template or locate relevant information in existing materials. Each piece of information or a link to the location of the information is stored in the data store 209 shown in FIG. 2 and described above. See block 309. Finally, the author (or others) associates the template identifier with the items stored in the data store 209, as shown by block 311. For example, the author of a business letter template could associate the template with an article on "Effective Communication in the Office" by associating the template identifier (e.g., AB 000003-4003-4003-00F-19FD9923AE22) with a link to the article (e.g., http://bcentral.msn.com/article/aug02/664-eco-htm). Thereafter, each time the template is opened, or document created using the template is opened by a user using the associated application, the associated template identifier is used to locate relevant information stored in the data store 209 and cause the information to be displayed on the user's computer, as described next.

Figure 4:
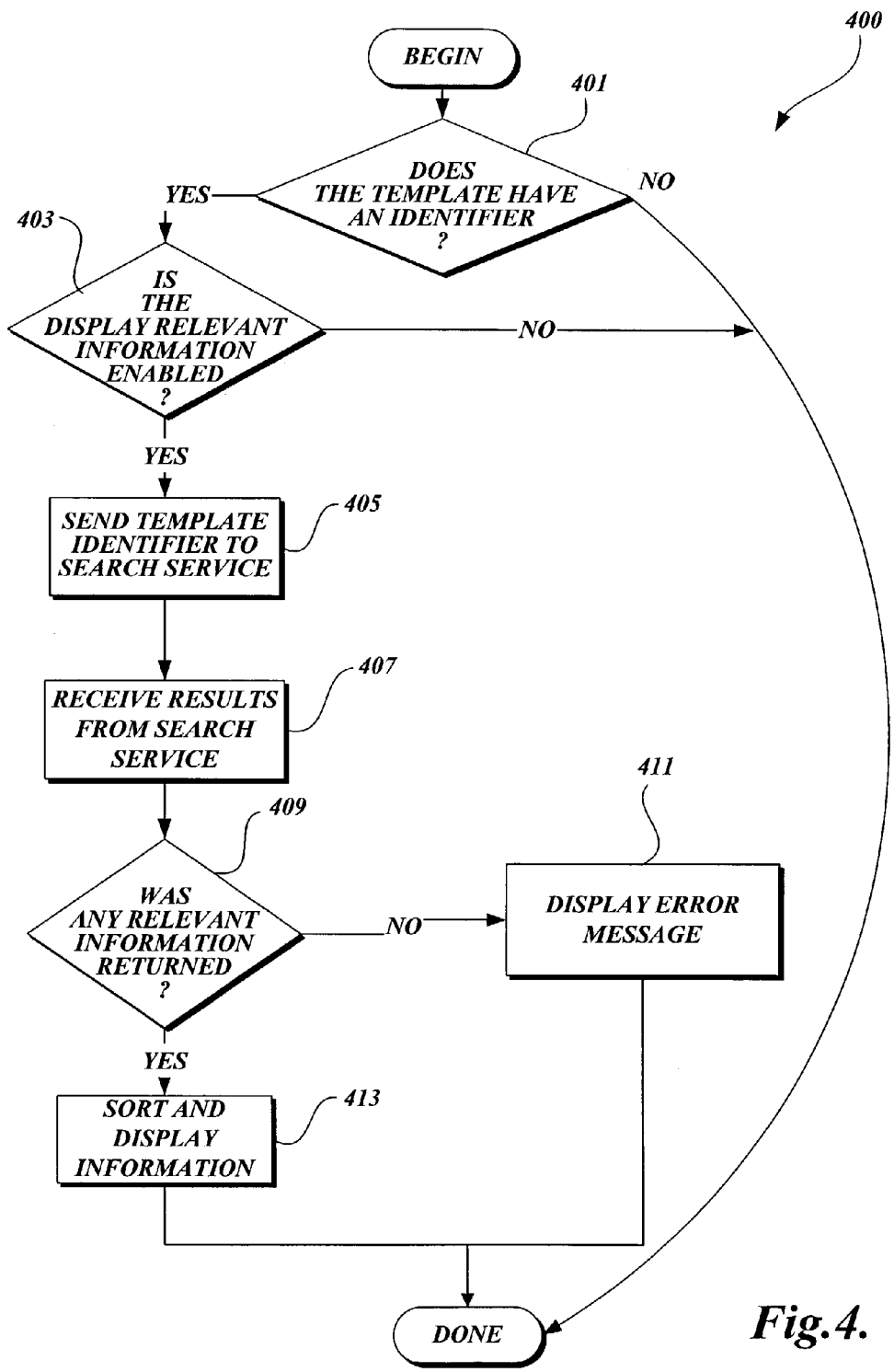
FIG. 4 is a flow diagram illustrating the process of retrieving and displaying relevant information.

FIG. 4 is a functional flow diagram illustrating the process of retrieving and displaying relevant information 400 when a template (or a document created using a template) is opened by an application program. After the template is opened, a test is made 401 to determine if the template has an identifier. If the template does not have an identifier, the process terminates. If the template has an identifier, a test 403 is made to determine if the display relevant information feature is enabled by the application program opening the template. If the display relevant information feature is not enabled, the process ends. If the display relevant information feature is enabled, the template identifier is sent 405 to the search service computer or other device 207 via the network 203 as part of a request for relevant information. In response, as discussed above, based on the template identifier, the search service computer or other device 207 locates relevant information stored in the data store 209.

The results of the search (if any) are returned to the calling user's computer, which receives the results from the search service, as noted in block 407. After the results are received or a predefined communication time out occurs, a test 409 is made to determine if any relevant information were returned by the search service. More specifically, the test looks to see if any results were determined by the search service within a predetermined period of time. If no results are returned, or if the predetermined period of time has elapsed, as illustrated in block 411, an error message is displayed. If relevant information was returned within the predetermined period of time, as noted in block 413, the relevant information is sorted in accordance with a grouping algorithm and displayed. Then the process ends.

The foregoing process steps are illustrated pictorially in FIG. 2. As shown in FIG. 2, the user's computer 201, after an application opens a template (or a document created using a template) and the computer determines that the display relevant information feature is enabled, sends a search request with unique identifier 215 to the search service computer or other device 207. In response, the search service computer or other device 207 searches the data store 209. The results of the search are returned 219 to the search service computer or other device 207, which forwards them 221 to the user's computer 201.

As noted above, FIG. 4 illustrates the process steps that occur when a template is opened. Identical process steps are followed when a document created using a template is opened. In this regard, as noted above, documents created using a template have an associated identifier that is the same as the related template identifier. As a result, when documents created using a template are opened by an application program, steps substantially identical to those illustrated in FIG. 4 occur. Because the steps are substantially identical, in order not to unduly expand this description, a duplicate process diagram is not included in the drawings and described here.

FIG. 5 is an exemplary screen shot 501 showing a document template window in a relevant information window (pane) created by a system implementing the present invention. More specifically, the exemplary screen shot 501 includes a template window 503 and a relevant information window or pane 505. The exemplary template window 503 includes a template for creating a business letter. The relevant information window or pane 505 includes a help topic section 507, a general topic section 509 and a recent article section 511. The relevant information template 505 also includes a rate this template section 513. Because help topics, general topics, and recent articles sections can take on a variety of forms, FIG. 5 and the following description of these topics and their content should be taken as illustrative, not limiting. The illustrated help topics section 507 includes three items: formatting margins, tracking changes, and inserting dates. Placing a mouse cursor over any of these items and "clicking" results in a window opening that contains information about the chosen item. The illustrated general topic section 509 includes two items—printing envelopes and using templates. When either of these items is activated by using a mouse to position a cursor over the item and clicking the mouse, a window opens that contains information about the chosen item. The recent article section 511 lists the titles of two articles—"Effective Business Communication" and "Cover Letters that Shine." When either of these items are "clicked" on, a link is created between the user's computer and the source of the article, which then opens in a window on the user's computer for review.

As will be readily appreciated by those skilled in the art and others from the foregoing description, when a template of the type illustrated in FIG. 5 (or a document created using the template) is opened, after locating the template identifier and determining that the relevant information window feature is enabled, the user's computer contacts the search service, which locates and returns the help topics, and the general topics information, and the recent article links. Alternatively, rather than returning the actual information associated with the help and general topics, the items listed under these topics may alternatively comprise links to appropriate sources of the relevant information. As will be readily appreciated by those skilled in the art and others, the search service can return almost any documentation or UI navigation including links to other parts of the UI (like a template gallery home page) or a news group related to the template.

The rate this template section 513 allows a user to rate the template by toggling on or off a series of stars (five in the illustrated embodiment of the invention), with the highest rating being all of the stars being toggled on by a user. The template rate information, after being set, is automatically sent to the search service for forwarding to the application author's computer for use by the author in evaluating the relevant information made available to users. This can be accomplished for example by making an HTTP/SOAP request to a Web method that logs the rating in a back end database when a user clicks on a star.

While the preferred embodiment of the invention has been illustrated and described, it will be appreciated that various changes can be made therein without departing from the spirit and scope of the invention. For example, while this invention was developed for use with templates and is described in connection with templates, those skilled in the art and others will appreciate that the underlying concept of applying a unique identifier to a template that results in a query to a remote data store can be applied to objects other than templates such as dialogs and other user interface (UI) objects. Hence, within the scope of the appended claims it is to be understood that the invention can be practiced otherwise than as specifically described herein.

The invention claimed is:

1. A system for locating and displaying information relative to a template that can be used to generate one or more documents, or a document created using a template, comprising:
   (a) a user computer, in response to said user computer opening said template, or said document created using a template, said user computer:
      (i) determining if said template, or said document created using a template, has a template identifier, said template identifier identifying said template as a template, or said document as a document created using a template; and
      (ii) if said template, or said document created using a template, has a template identifier, automatically, without further user input:
         (1) preparing a request for relevant information that includes said template identifier;
         (2) forwarding said request for relevant information to a search service; and (3) in response to receiving a reply to said request from said search service, displaying information contained in said reply for reviewing by a user of said user computer;
(b) a search service remote from said user computer for:
  (i) receiving said request for relevant information;
  (ii) retrieving information relevant to said template, or document created using said template, from a data store based on the template identifier, said retrieved information including information that explains and/or demonstrates the use of said template;
  (iii) generating said reply to said request for relevant information based on said retrieved information; and
  (iv) sending said reply to said request to said user computer; and
(c) a network for coupling said user computer to said search service, said network forwarding said request for relevant information from said user computer to said search service and returning said reply to said request from said search service to said user computer.

2. A system as claimed in claim 1 wherein the information contained in said reply is displayed concurrently on said user computer with said template, or said document created using a template.

3. The system of claim 1 wherein said information contained in said reply to said request is sorted and logically grouped before being displayed.

4. The system claimed in claim 1 including an author computer for updating information in said data store related to said template identifier, said author computer coupled to said data store.

5. The system claimed in claim 4 wherein said author computer is coupled to said data store via said network.

6. A computer-executable method for locating and displaying information relevant to a template that can be used to generate one or more documents, or a document created using a template, comprising:
(a) analyzing said template, or said document created using a template, to determine if said template, or said document created using a template, has a template identifier, said template identifier identifying said template as a template, or said document as a document created using a template; and
(b) if said template, or said document created using a template, has a template identifier, automatically, without further user input:
  (1) preparing a request for relevant information that includes said template identifier;
  (2) transmitting said request for relevant information to a remotely located search service;
  (3) upon receipt of said request for relevant information, said remotely located search service retrieving information relevant to said template, or said document created using a template, from a data store based on said template identifier said retrieved information including information that explains and/or demonstrates the use of said template;
  (4) returning said retrieved information; and
  (5) displaying said returned retrieved information.

7. The method claimed in claim 6 wherein said returned retrieved information is filtered and logically grouped before being displayed.

8. The method claimed in claim 6 wherein said returned retrieved information is displayed concurrently with said template, or said document created using said template.

* * * * *